(12) United States Patent
Lee et al.

(10) Patent No.: US 9,998,192 B2
(45) Date of Patent: Jun. 12, 2018

(54) METHOD AND TERMINAL FOR PERFORMING BEAMFORMING BASED ON SENSOR INFORMATION OF TERMINAL

(71) Applicant: ELECTRONICS AND TELECOMMUNICATIONS RESEARCH INSTITUTE, Daejeon (KR)

(72) Inventors: Juyul Lee, Daejeon (KR); Myung Don Kim, Daejeon (KR); Bong Hyuk Park, Daejeon (KR); Jae Joon Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days. days.

(21) Appl. No.: 15/424,996

(22) Filed: Feb. 6, 2017

(65) Prior Publication Data

US 2017/0244458 A1 Aug. 24, 2017

(30) Foreign Application Priority Data

Feb. 24, 2016 (KR) .................. 10-2016-0022065

(51) Int. Cl.
*H04B 7/06* (2006.01)
*H04L 25/02* (2006.01)
*H04W 64/00* (2009.01)

(52) U.S. Cl.
CPC ......... *H04B 7/0617* (2013.01); *H04B 7/0619* (2013.01); *H04L 25/024* (2013.01); *H04W 64/00* (2013.01)

(58) Field of Classification Search
CPC .... H04B 7/026; H04B 7/0426; H04B 7/0452; H04B 7/0617; H04L 25/024; H04L 25/0226; H04L 5/0048; H04W 72/046; H04W 24/10; H04W 64/00
See application file for complete search history.

(56) References Cited

U.S. PATENT DOCUMENTS

| 2009/0225813 | A1 | 9/2009 | Im |
| 2012/0182895 | A1 | 7/2012 | Jwa |
| 2013/0070827 | A1 | 3/2013 | Li et al. |
| 2014/0355704 | A1 | 12/2014 | Lee et al. |
| 2017/0155439 | A1* | 6/2017 | Chang .................. H04B 7/0617 |
| 2017/0163325 | A1* | 6/2017 | Kang .................. H04B 7/0617 |
| 2017/0194706 | A1* | 7/2017 | Lee ..................... H04B 7/0617 |

* cited by examiner

*Primary Examiner* — Thanh Le
(74) *Attorney, Agent, or Firm* — LRK Patent Law Firm

(57) ABSTRACT

A method and terminal for performing beamforming. The beamforming method of a terminal includes acquiring a beamforming signal, calculating a beamforming coefficient to correspond to locations of a transmitter and a receiver, based on the beamforming signal, acquiring sensor information of the terminal, estimating a channel parameter based on the sensor information, and determining a final beamforming coefficient based on the beamforming coefficient and the channel parameter.

15 Claims, 17 Drawing Sheets

METHOD AND TERMINAL FOR PERFORMING BEAMFORMING BASED ON SENSOR INFORMATION OF TERMINAL

CROSS-REFERENCE TO RELATED APPLICATION

This application claims the benefit of Korean Patent Application No. 10-2016-0022065, filed on Feb. 24, 2016, in the Korean Intellectual Property Office, the disclosure of which is incorporated herein by reference.

BACKGROUND

1. Field of the Invention

One or more example embodiments relate to a method of performing beamforming in a terminal and the terminal for performing the method.

2. Description of Related Art

Beamforming may refer to determining of beam directions to transmit and receive beams at a highest signal level between a transmitter and a receiver to maximize utilization of a straightness and a path loss in a high frequency domain. To realize the beamforming, a device for acquiring information for the beamforming, and a device for determining a beamforming coefficient based on the acquired information may be used.

FIG. 1 illustrates an example of beamforming in a general mobile communication environment according to a related art.

As a frequency band increases, a straightness of a radio wave may increase, and a loss in a free space may also increase. Accordingly, to set an effective communication link in a terminal, beamforming may be necessarily performed.

The loss in the free space may have a relationship of Equation 1 as shown below, based on a Friis equation when an antenna gain is assumed to be "1."

$$L = 20\log_{10}\frac{4\pi Rf}{c} \quad \text{[Equation 1]}$$

In Equation 1, L denotes the loss, f denotes a frequency, and R denotes a distance between a transmission antenna and a reception antenna.

In an example, when a frequency is set to 2 gigahertz (GHz) at the distance R of "100" meters (m), a path loss of about 78.46 decibels (dB) may occur. In another example, when a frequency is set to 20 GHz based on the same distance, a path loss of about 98.46 dB may occur. Thus, it may be found that an additional loss of about 20 dB occurs as a frequency band increases.

Hereinafter, various beamforming methods according to the related art will be described.

FIG. 2 illustrates a method of acquiring beam information for beamforming using a feedback channel and a communication channel between a transmitter (TX) and a receiver (RX) according to the related art.

In the method of FIG. 2, the communication channel and the feedback channel may be used to acquire beam information for beamforming.

For example, a receiver may receive a signal from a transmitter through the communication channel, may extract information of beams and may determine a reception beamforming. Also, the receiver may transmit information of received beams to the transmitter through the feedback channel, and accordingly a transmission beamforming of the transmitter may be determined. In this example, various beamforming methods according to the related art may be used based on whether the communication channel and the feedback channel are present.

In a beamforming method, when a feedback channel is absent, a direction of a received beam may be determined based on an intensity of a signal received through a communication channel, and a direction of a transmitted beam in a transmitter may be determined as all directions. In another beamforming method, information for beamforming may be transmitted between a transmitter and a receiver based on a type of feedback channels (for example, based on a transmission of information of 1 bit indicating yes or no, or a portion or all of beamforming information).

FIG. 3 illustrates an example of beamforming using an array antenna according to the related art.

A beamforming coefficient may be determined to acquire beam information for beamforming, which may indicate a method of determining coefficients, for example, coefficients $c_1$, $c_2$ and $c_N$, multiplied for each antenna element of the array antenna as shown in FIG. 3. Based on values of the coefficients, a width and a direction of a synthesized beam of the array antenna may be determined.

The determining of the beamforming coefficient is limited to the coefficients of the array antenna as described above, however, may need to be interpreted as comprehensive meaning of determining a direction of a high directional antenna. For example, in a horn antenna, determining of a beamforming coefficient may indicate determining of a boresight that is a direction of the horn antenna.

As described above, due to a considerable path loss in a high frequency domain, for example, a millimetric wave, it is impossible to avoid use of a high directional antenna.

Accordingly, when the high directional antenna is used, the following issues may occur.

A link setup time required to search for all directions may increase because it is impossible to know a direction of a beam during an initial communication link setup.

Also, a communication link is highly likely to be broken due to a sudden change in a transmitter and a receiver or surroundings of the communication link when a high directional antenna is used for a frequency with a strong straightness. In many cases, for example, a case in which a direction of a face is changed by suddenly turning a head while talking over a terminal in contact with the face, the communication link may be broken.

FIGS. 4A and 4B illustrate a blocking phenomenon in a line of sight (LOS) communication link situation according to the related art.

For example, when a communication link is set between a TX and an RX as shown in FIG. 4A, a specific obstacle may cover the communication link.

In this example, received power in the TX and the RX may change as shown in FIG. 4B. A low received power may correspond to a point in time at which an obstacle appears between the transmitter TX and the receiver RX.

The above phenomenon in which receiving power of the communication link changes due to the obstacle may be referred to as a "blocking phenomenon." The blocking phenomenon may also occur in a high directional antenna.

SUMMARY

Example embodiments may provide a method of utilizing information sensed by various sensors of a terminal (for example, a motion sensor, an acceleration sensor, a compass or a global positioning system (GPS)) for beamforming.

Also, the example embodiments may provide a method of reducing a period of time to search for a beam during a setup of a communication link and of maintaining a connection to the communication link regardless of a sudden state change of a terminal, for example, a blocking phenomenon.

According to an aspect, there is provided a beamforming method of a terminal, including acquiring a beamforming signal, calculating a beamforming coefficient to correspond to locations of a transmitter and a receiver, based on the beamforming signal, acquiring sensor information of the terminal, estimating a channel parameter based on the sensor information, and determining a final beamforming coefficient based on the beamforming coefficient and the channel parameter.

The acquiring of the beamforming signal may include acquiring the beamforming signal using one of a feedback channel and an observed signal level.

The acquiring of the sensor information may include acquiring the sensor information from at least one sensor among a motion sensor, an acceleration sensor, a compass and a GPS.

The estimating of the channel parameter may include estimating a wireless channel environment of the terminal and a variable of a physical channel of the terminal.

The estimating of the wireless channel environment and the variable of the physical channel of the terminal may include estimating at least one of information about a movement, a location and an orientation of the terminal based on the sensor information.

The determining of the final beamforming coefficient may include acquiring a movement state of the terminal and a wireless channel environment of the terminal based on the channel parameter, and determining the final beamforming coefficient by synthetically using the beamforming coefficient, the wireless channel environment and the movement state.

The beamforming method may further include performing beamforming based on the final beamforming coefficient.

The determining of the final beamforming coefficient may include determining the final beamforming coefficient so that a main beam is formed in a first direction determined by the beamforming coefficient and that an auxiliary beam is formed in a second direction determined by the channel parameter.

The determining of the final beamforming coefficient may further include determining the final beamforming coefficient so that a beam is formed in a first direction determined by the beamforming coefficient, sensing a change in a signal level during a communication based on the final beamforming coefficient, and updating the final beamforming coefficient to immediately change the first direction to a second direction determined by the channel parameter.

According to another aspect, there is provided a terminal including a signal acquirer configured to acquire a beamforming signal, a calculator configured to calculate a beamforming coefficient to correspond to locations of a transmitter and a receiver, a sensor information acquirer configured to acquire sensor information of the terminal, an estimator configured to estimate a channel parameter based on the sensor information, and a determiner configured to determine a final beamforming coefficient based on the beamforming coefficient and the channel parameter.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
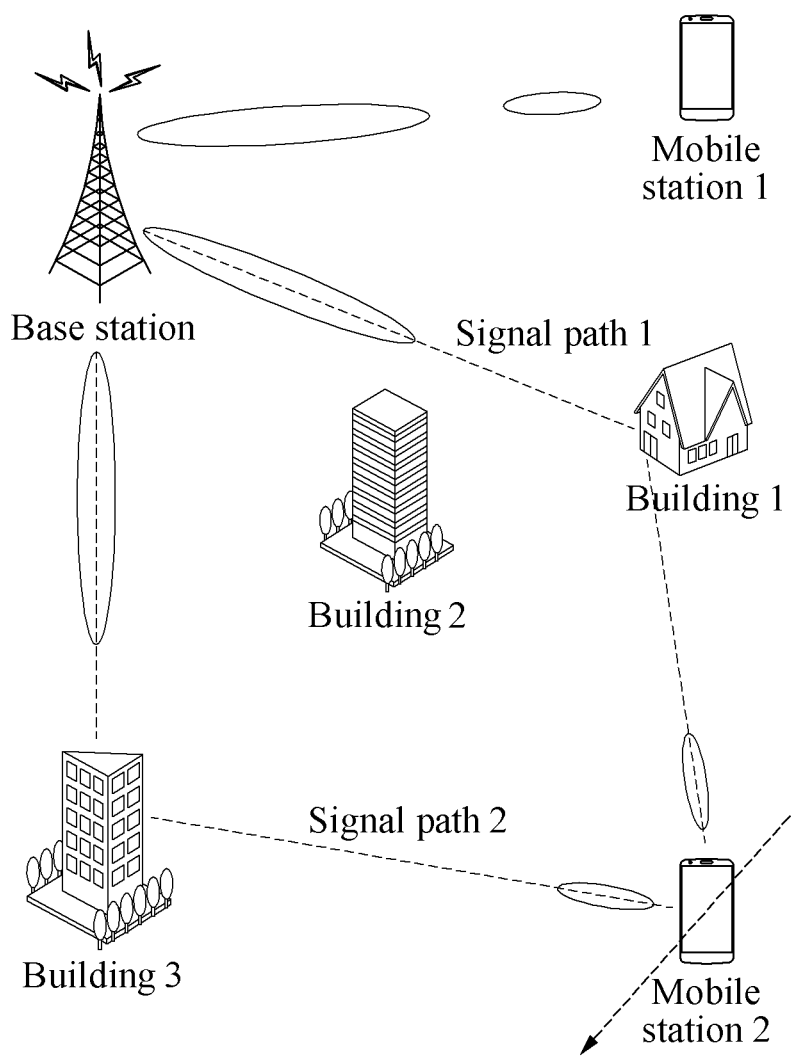
FIG. 1 illustrates an example of beamforming in a general mobile communication environment according to a related art.

Hereinafter, example embodiments will be described in detail with reference to the accompanying drawings.

Various modifications may be made to the example embodiments. However, it should be understood that these embodiments are not construed as limited to the illustrated forms and include all changes, equivalents or alternatives within the idea and the technical scope of this disclosure.

The terminology used herein is for the purpose of describing particular example embodiments only and is not intended to be limiting of the example embodiments. As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings. Also, in describing of example embodiments, detailed description of well-known related structures or functions will be omitted when it is deemed that such description will cause ambiguous interpretation of the present disclosure.

Figure 5A:
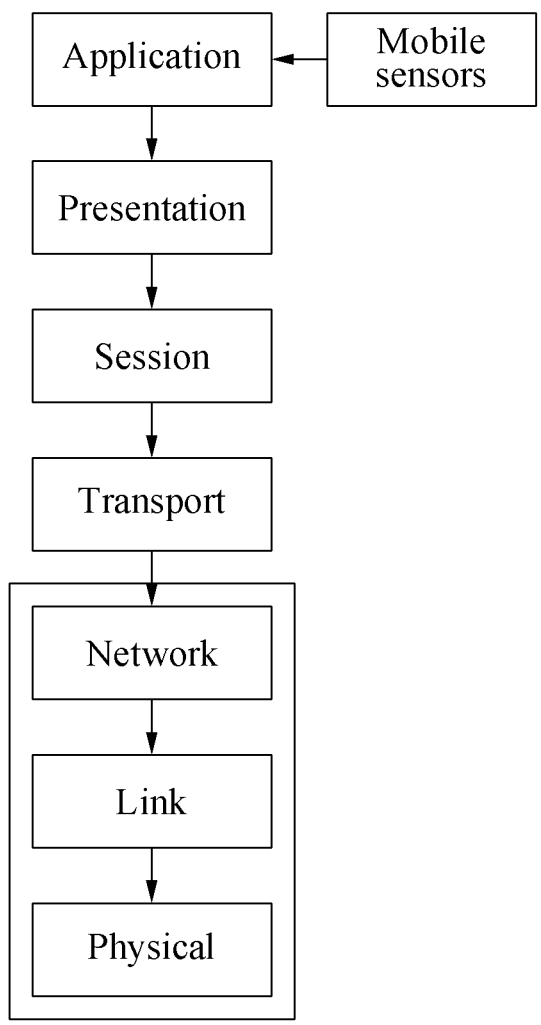
FIGS. 5A and 5B illustrate an association relationship between sensors and layers utilized in an Open Systems Interconnection (OSI) 7 model according to the related art and an example embodiment.
Figure 5B:
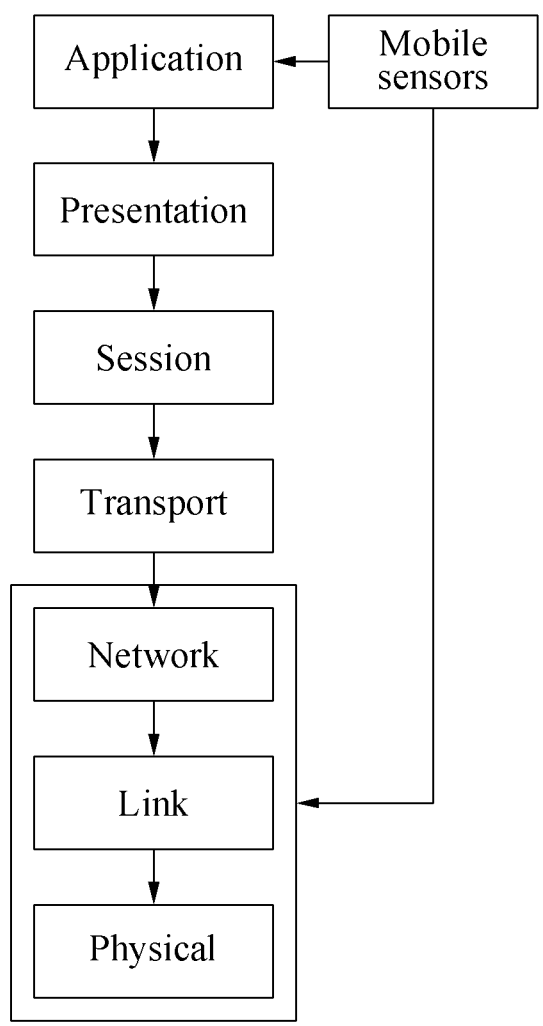

FIGS. 5A and 5B illustrate an association relationship between sensors and layers utilized in an Open Systems Interconnection (OSI) 7 model according to the related art and an example embodiment. FIGS. 5A and 5B illustrate an association relationship between sensors mounted in a terminal and an OSI 7 network layer.

In the related art of FIG. 5A, sensor information acquired from mobile sensors may be utilized in an application layer that is a topmost layer of the terminal.

Referring to FIG. 5B, sensor information acquired from mobile sensors may be transmitted to three lower layers, for example, a network layer, a link layer and a physical layer. The acquired sensor information may be combined and utilized in a beamforming method used in a communication channel and/or a feedback channel in an existing communication environment.

Figure 6:
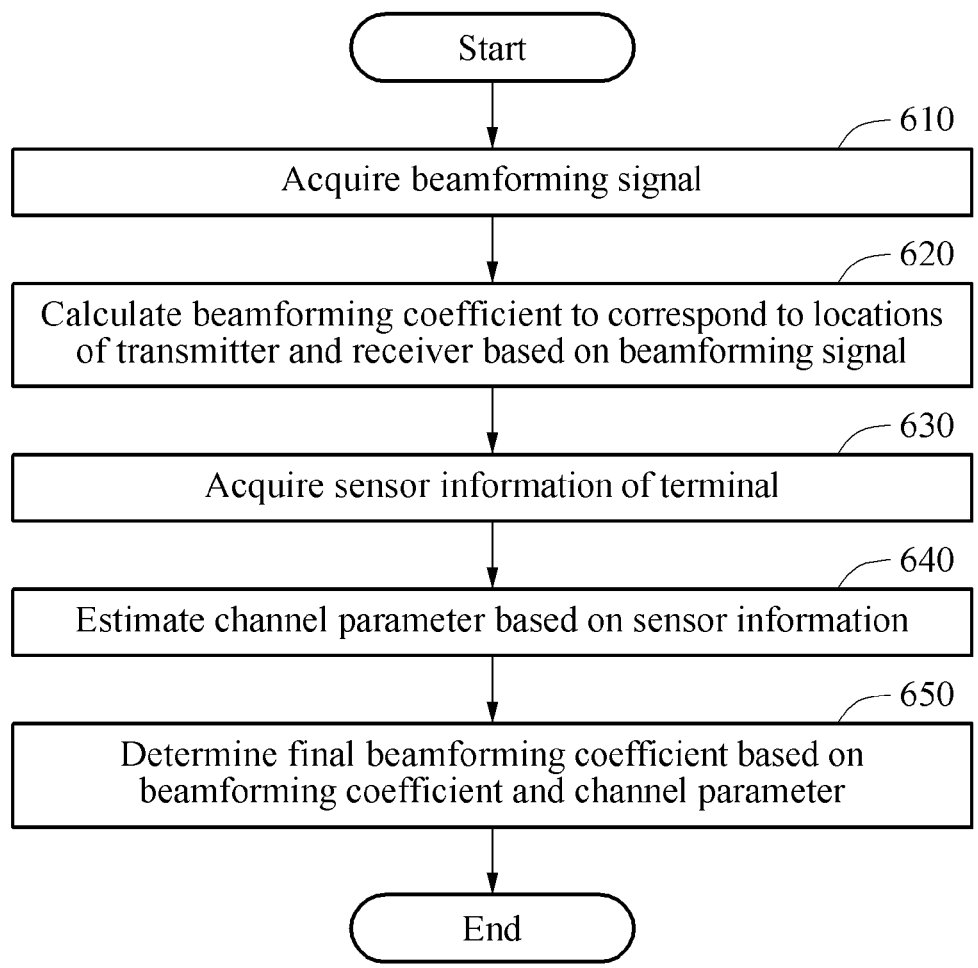
FIG. 6 is a flowchart illustrating a beamforming method performed by a terminal according to an example embodiment.

FIG. 6 is a flowchart illustrating a beamforming method performed by a terminal according to an example embodiment.

Referring to FIG. 6, in operation 610, the terminal may acquire a beamforming signal.

The beamforming signal may include, for example, a signal received in an existing communication environment to perform beamforming in the terminal. The beamforming signal may be received through a feedback channel or based on a signal level observed by the terminal.

In operation 620, the terminal may calculate a beamforming coefficient to correspond to locations of a transmitter and a receiver, based on the beamforming signal.

Figure 2:
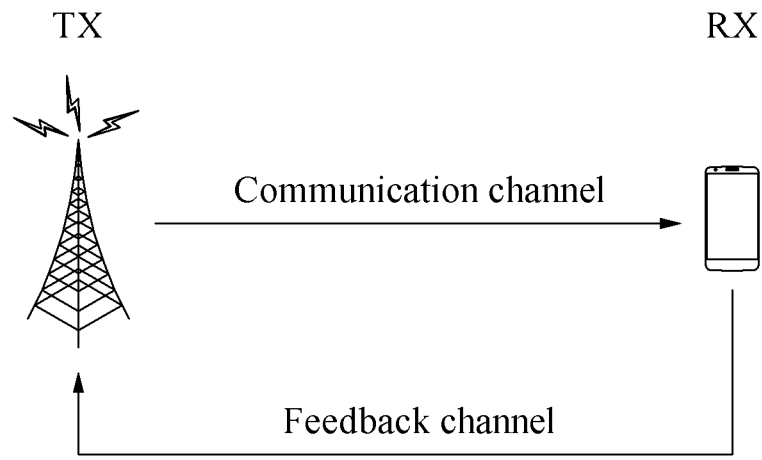
FIG. 2 illustrates a method of acquiring beam information for beamforming using a feedback channel and a communication channel between a transmitter (TX) and a receiver (RX) according to the related art.
Figure 3:
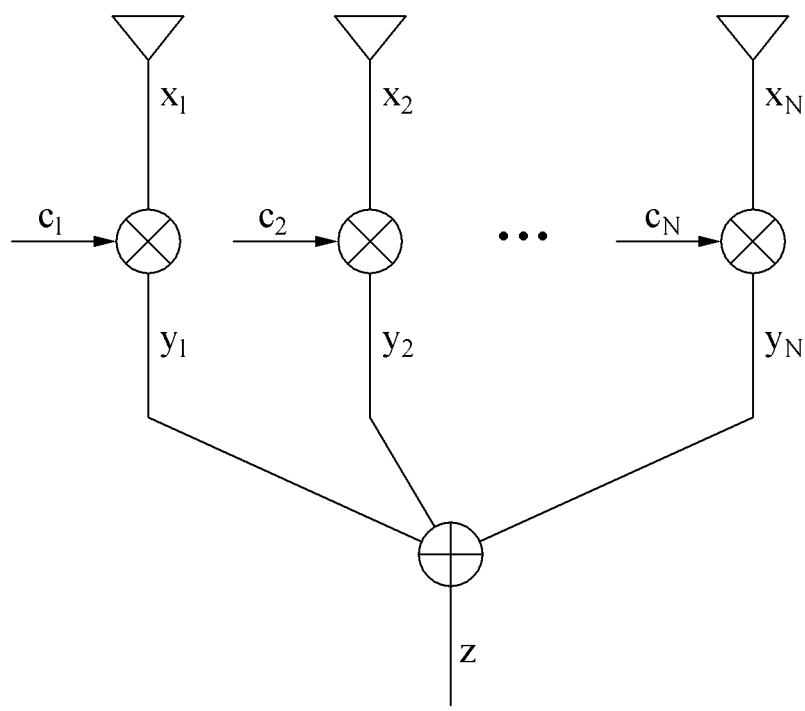
FIG. 3 illustrates an example of beamforming using an array antenna according to the related art.
Figure 4A:
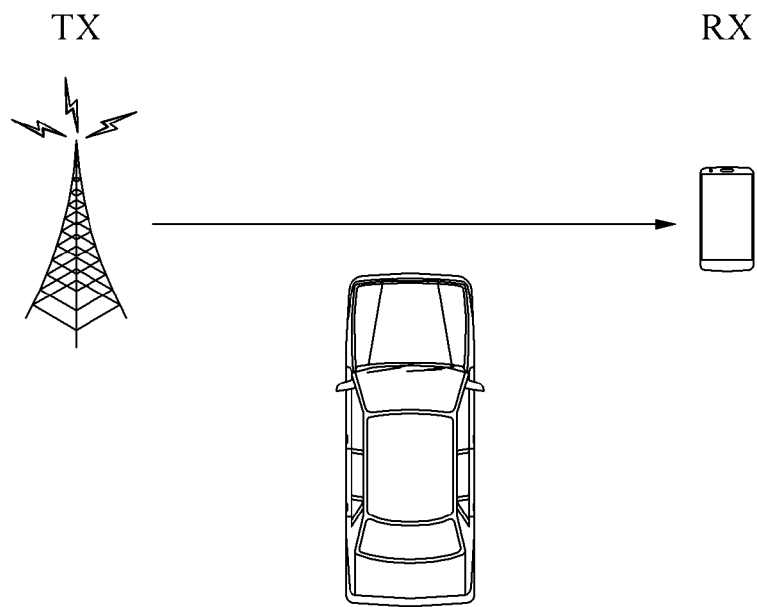
FIGS. 4A and 4B illustrate a blocking phenomenon in a line of sight (LOS) communication link situation according to the related art.
Figure 4B:
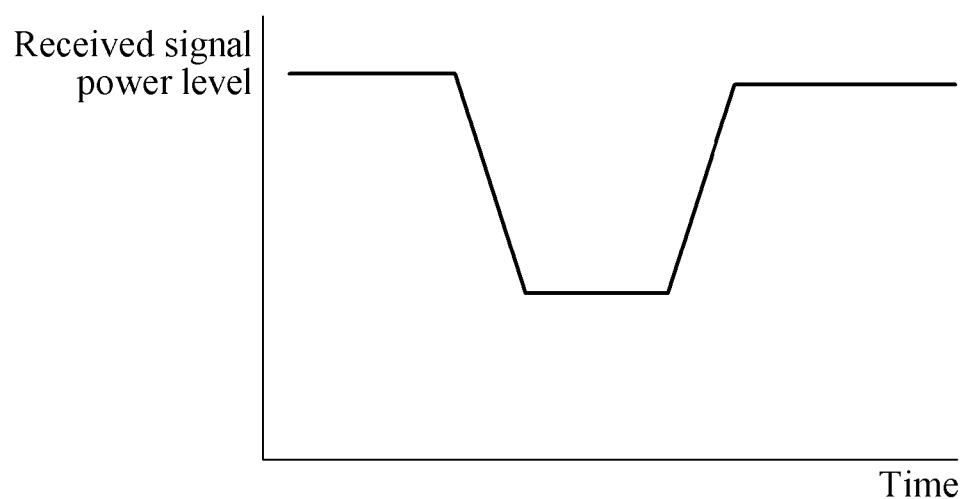

The beamforming coefficient may be calculated using the method described above with reference to FIGS. 2 and 3. For example, a method of determining a beamforming coefficient based on values of coefficients multiplied for each antenna may be used to calculate the beamforming coefficient.

In operation 630, the terminal may acquire sensor information of the terminal.

Operation 630 may not correlate with operation 610 in a time series. For example, operation 630 may be performed prior to operation 610, or operation 610 may be performed prior to operation 630.

The terminal may acquire sensor information sensed by a sensor, for example, a motion sensor (for example, a gyro sensor), an acceleration sensor, a compass or a global positioning system (GPS). The terminal may be, for example, a smartphone, and may include various sensors.

In operation 640, the terminal may estimate a channel parameter based on the sensor information.

The channel parameter may be estimated based on the sensor information. A concept of a parameter of a wireless channel may include estimation of a variable of a physical channel and a wireless channel environment of a transmitter and a receiver.

For example, a real time movement of the terminal may be sensed based on sensor information of an acceleration sensor, and a location and a movement of the terminal may be estimated based on sensor information of a motion sensor. Also, an orientation of the terminal may be estimated based on sensor information of an electronic compass, and comprehensive information, for example, an actual location of the terminal, may be estimated based on sensor information of a GPS.

In operation 650, the terminal may determine a final beamforming coefficient based on the beamforming coefficient and the channel parameter.

For example, a wireless channel environment of the terminal and a movement state of the terminal may be acquired based on a channel parameter of a wireless channel acquired from a sensor of the terminal, and a beamforming coefficient and information about a communication environment and the movement state of the terminal may be synthetically used, to determine a final beamforming coefficient. Also, based on the final beamforming coefficient, beamforming may be performed.

Hereinafter, two examples of a method of performing beamforming may be provided.

In an example, the final beamforming coefficient may be determined so that a main beam and an auxiliary beam may be formed in a first direction determined by the beamforming coefficient and in a second direction determined by the channel parameter, respectively. In this example, beamforming may be performed based on the final beamforming coefficient.

In another example, beamforming may be performed in a main beam direction corresponding to a first direction determined by the beamforming coefficient, or in an auxiliary beam direction corresponding to a second direction determined by the channel parameter.

For example, the final beamforming coefficient may be determined so that a beam may be formed in a first direction determined by the beamforming coefficient. In this example, when a change in a signal level is sensed during a communication based on the final beamforming coefficient, a terminal may update the final beamforming coefficient so that a direction of a beam may be immediately changed to a second direction determined by a channel parameter acquired based on a sensor of the terminal, instead of searching for a new beam again and performing beamforming.

Figure 7:
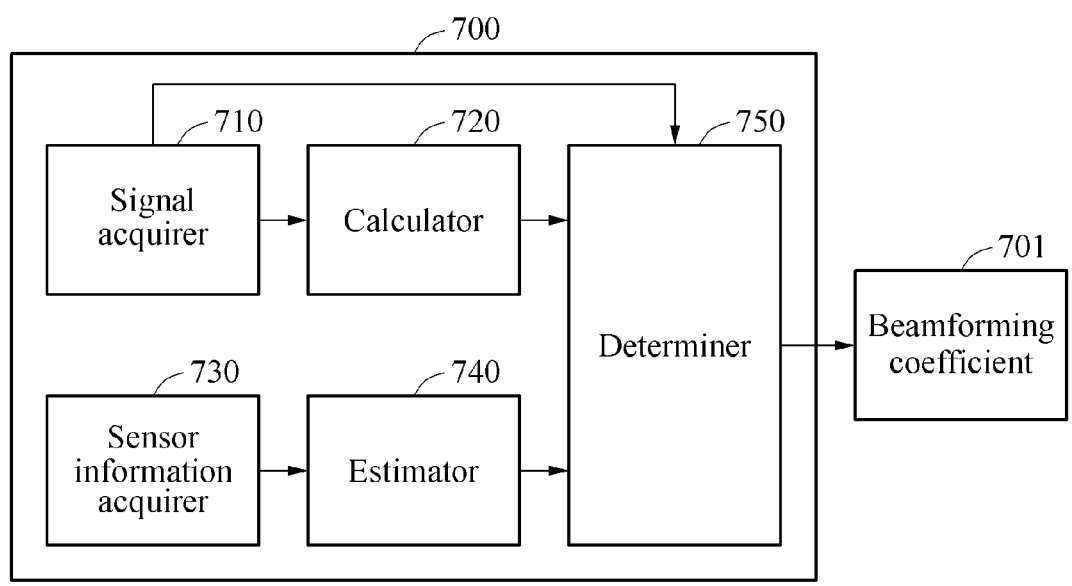
FIG. 7 is a block diagram illustrating a configuration of a terminal for performing a beamforming method according to an example embodiment.

FIG. 7 is a block diagram illustrating a configuration of a terminal 700 for performing a beamforming method according to an example embodiment. Referring to FIG. 7, the terminal 700 may include a signal acquirer 710, a calculator 720, a sensor information acquirer 730, an estimator 740 and a determiner 750.

The signal acquirer 710 may acquire a beamforming signal.

The beamforming signal may include, for example, a signal received in an existing communication environment to perform beamforming in the terminal. The beamforming signal may be received through a feedback channel or based on a signal level observed by the terminal.

The calculator 720 may calculate a beamforming coefficient to correspond to locations of a transmitter and a receiver, based on the beamforming signal.

The beamforming coefficient may be calculated using the method described above with reference to FIGS. 2 and 3. For example, a method of determining a beamforming coefficient based on values of coefficients multiplied for each antenna element of an antenna may be used to calculate the beamforming coefficient.

The sensor information acquirer 730 may acquire sensor information of the terminal 700.

The acquiring of the sensor information may not correlate with the acquiring of the beamforming signal in a time series. For example, the beamforming signal may be acquired earlier than the sensor information, or the sensor information may be acquired earlier than the beamforming signal.

The estimator 740 may estimate a channel parameter based on the sensor information.

The channel parameter may be estimated based on the sensor information. A concept of a parameter of a wireless channel may include estimation of a variable of a physical channel and a wireless channel environment of a transmitter and a receiver.

The determiner 750 may determine a final beamforming coefficient 701 based on the beamforming coefficient and the channel parameter.

Hereinafter, a method of determining a beamforming coefficient will be further described.

Figure 8:
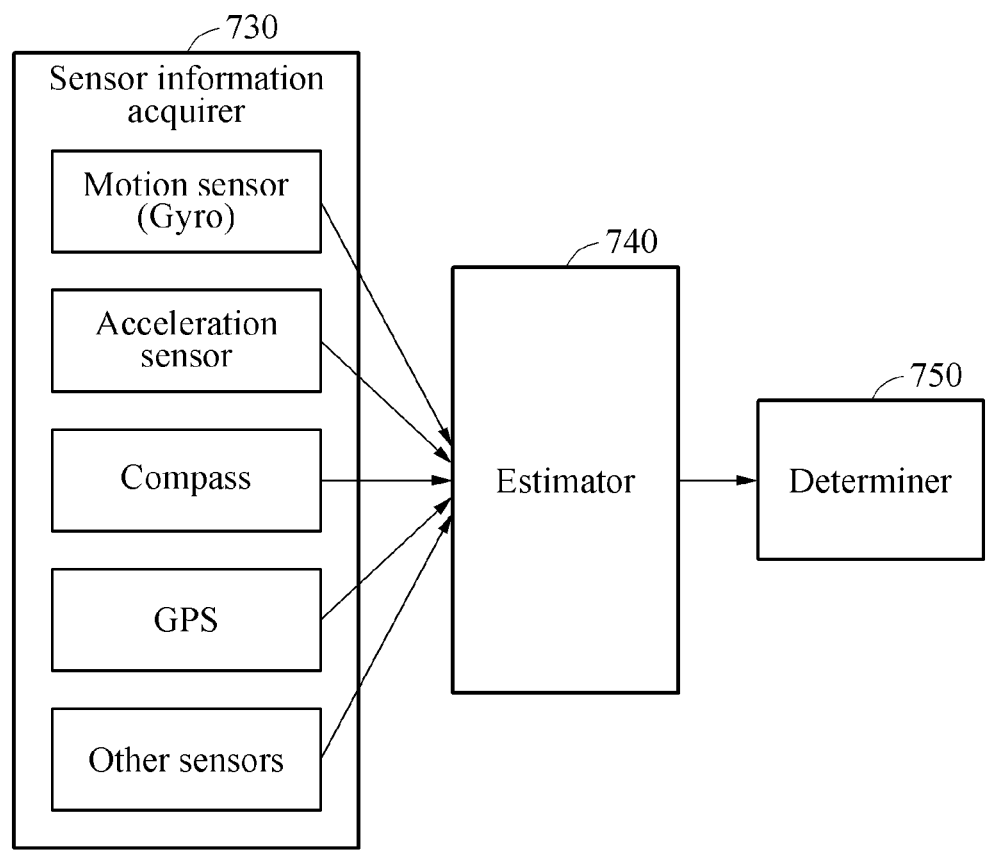
FIG. 8 is a block diagram illustrating a method of determining a beamforming coefficient according to an example embodiment.

FIG. 8 is a block diagram illustrating a method of determining a beamforming coefficient according to an example embodiment.

The sensor information acquirer 730 of FIG. 7 may acquire sensor information sensed by a sensor, for example, a motion sensor (for example, a gyro sensor), an acceleration sensor, a compass or a GPS. The terminal 700 may be, for example, a smartphone, and may include various sensors.

The estimator 740 may estimate a channel parameter based on the sensor information. As described above, a variable of a physical channel and a wireless channel environment of a transmitter and a receiver may be estimated.

For example, a real time movement of a terminal may be sensed based on sensor information of an acceleration sensor, and a location and a movement of the terminal may be estimated based on sensor information of a motion sensor. Also, an orientation of the terminal may be estimated based on sensor information of an electronic compass, and comprehensive information, for example, an actual location of the terminal, may be estimated based on sensor information of a GPS.

The determiner 750 may determine a final beamforming coefficient based on the estimated channel parameter.

For example, a wireless channel environment of a terminal and a movement state of the terminal may be acquired based on a channel parameter of a wireless channel acquired from a sensor of the terminal, and a beamforming coefficient and information about a communication environment and the movement state of the terminal may be synthetically used, to determine a final beamforming coefficient. Also, based on the final beamforming coefficient, beamforming may be performed.

Hereinafter, two examples of a method of performing beamforming may be provided.

In an example, the final beamforming coefficient may be determined so that a main beam and an auxiliary beam may be formed in a first direction determined by the beamforming coefficient and in a second direction determined by the channel parameter, respectively. In this example, beamforming may be performed based on the final beamforming coefficient.

In another example, beamforming may be performed in a main beam direction corresponding to a first direction determined by the beamforming coefficient, or in an auxiliary beam direction corresponding to a second direction determined by the channel parameter.

For example, the final beamforming coefficient may be determined so that a beam may be formed in a first direction determined by the beamforming coefficient. In this example, when a change in a signal level is sensed during a communication based on the final beamforming coefficient, a terminal may update the final beamforming coefficient so that a direction of a beam may be immediately changed to a second direction determined by a channel parameter acquired based on a sensor of the terminal, instead of searching for a new beam again and performing beamforming.

Figure 9A:
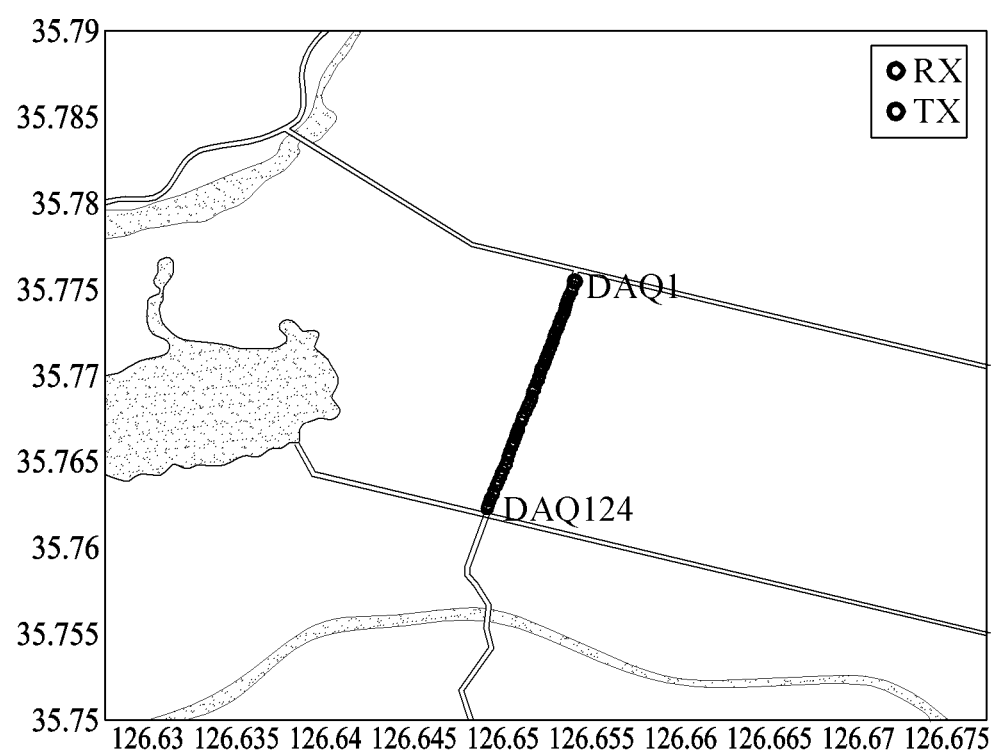
FIGS. 9A and 9B illustrate an example of estimating a channel parameter using a global positioning system (GPS) according to an example embodiment.
Figure 9B:
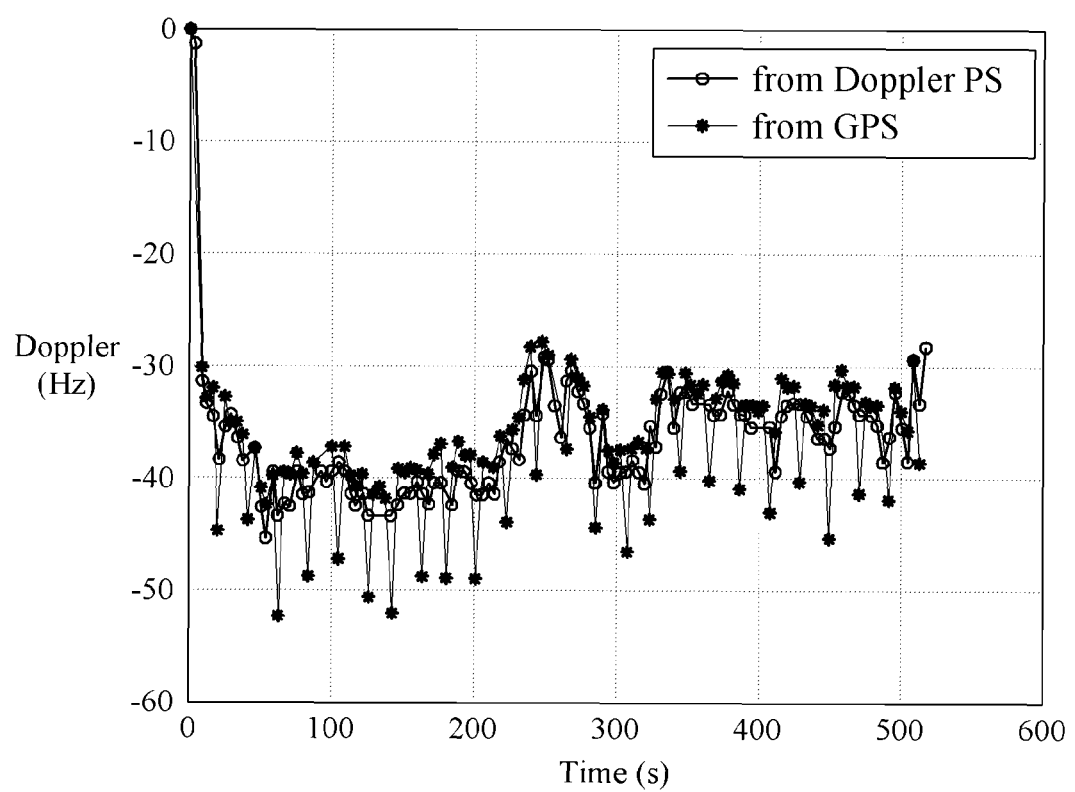

FIGS. 9A and 9B illustrate an example of estimating a channel parameter using a GPS according to an example embodiment.

FIG. 9A illustrates a scheme of estimating a channel parameter using a GPS (or an acceleration sensor), and FIG. 9B illustrates a graph of a comparison between a Doppler result of a channel response and a Doppler result of the GPS or the acceleration sensor based on data acquired from an experiment of the scheme of FIG. 9A.

Referring to FIG. 9A, when a transmitter is installed around a location DAQ1 in a map and when a corresponding receiver is slightly moving from the location DAQ1 to a location DAQ124, channel parameters may be measured.

When channel parameters are estimated while the receiver slightly moves from the location DAQ1 to the location DAQ124 as described above, a result of FIG. 9B may be obtained. It may be found that the Doppler result of the channel response (indicated by "from Doppler PS") and the Doppler result of the GPS (indicated by "from GPS") are quite similar to each other.

Figure 10A:
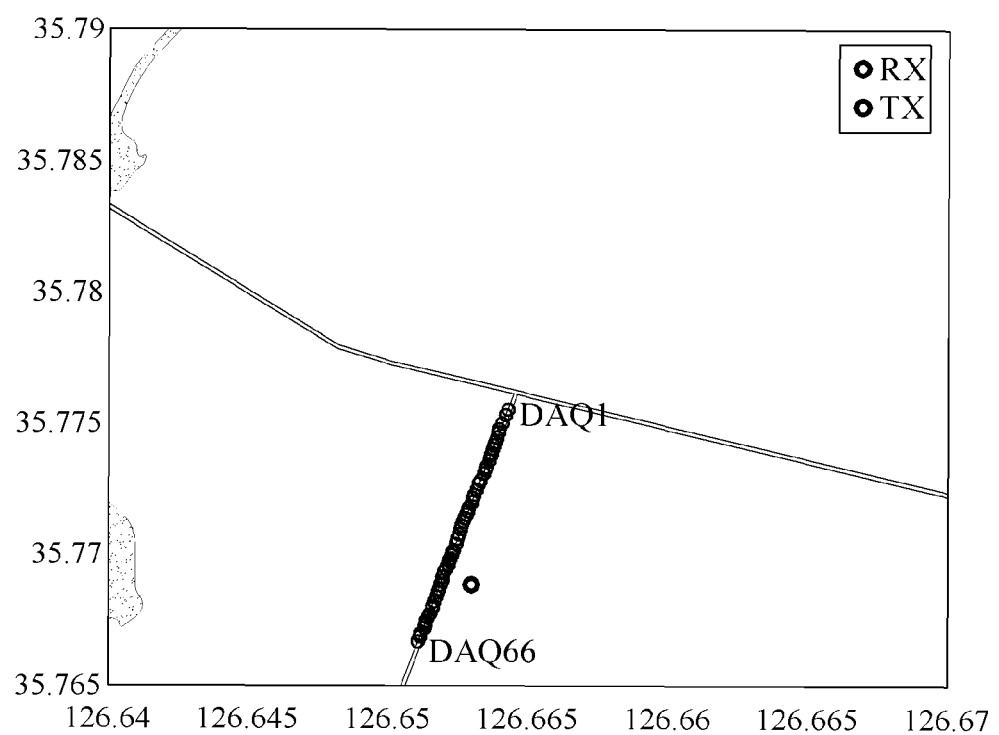
FIGS. 10A and 10B illustrate an example of estimating a channel parameter based on an angle of arrival (AoA) according to an example embodiment.
Figure 10B:
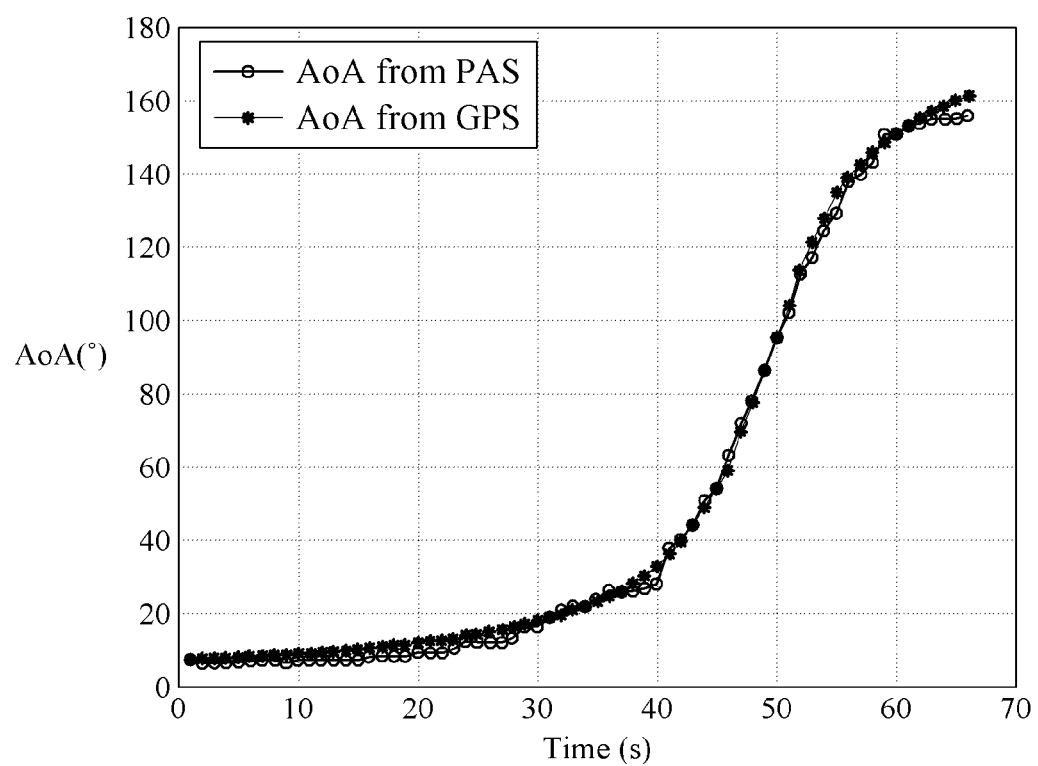

FIGS. 10A and 10B illustrate an example of estimating a channel parameter based on an angle of arrival (AoA) according to an example embodiment.

FIG. 10A illustrates an example of estimating an AoA among channel parameters, and FIG. 10B illustrates a graph of a result of an experiment of the example of FIG. 10A.

Referring to FIG. 10A, when a transmitter is installed around a location DAQ1 in a map and when a corresponding receiver is slightly moving from the location DAQ1 to a location DAQ66, channel parameters may be measured.

When an AoA is measured while the receiver slightly moves from the location DAQ1 to the location DAQ66, the graph of FIG. 10B may be obtained as a measurement result. In FIG. 10B, "AoA from PAS" indicates AoA information estimated for all the locations DAQ1 through DAQ66, and "AoA from GPS" indicates location-based estimates of an angle using an actual GPS. The above two result values may be substantially the same.

FIGS. 11A, 11B, 11C, 11D, 11E and 11F illustrate snapshots of an example of using an AoA according to an example embodiment. The snapshots may correspond to the example of FIGS. 10A and 10B.

Figure 11A:
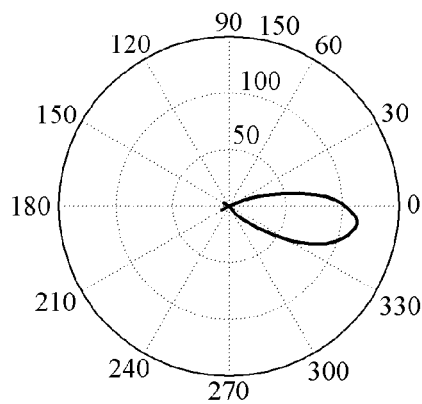
FIGS. 11A, 11B, 11C, 11D, 11E and 11F illustrate snapshots of an example of using an AoA according to an example embodiment.
Figure 11B:
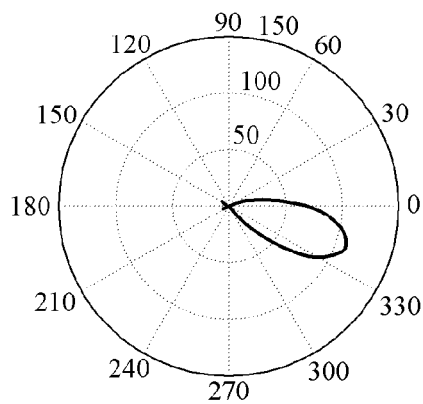
Figure 11C:
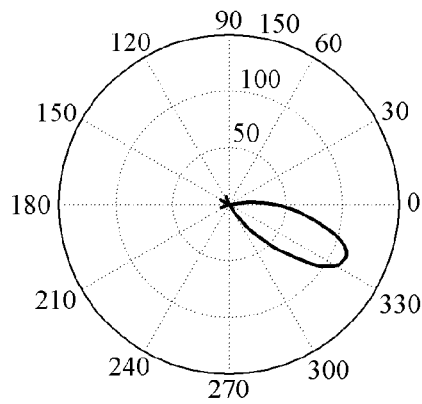
Figure 11D:
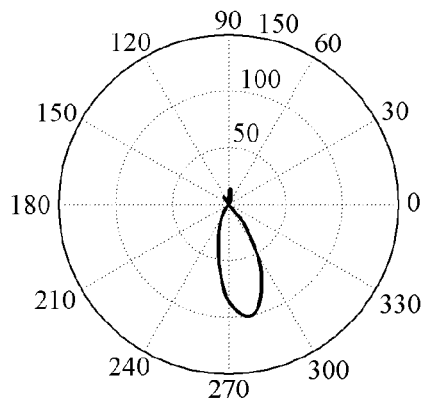
Figure 11E:
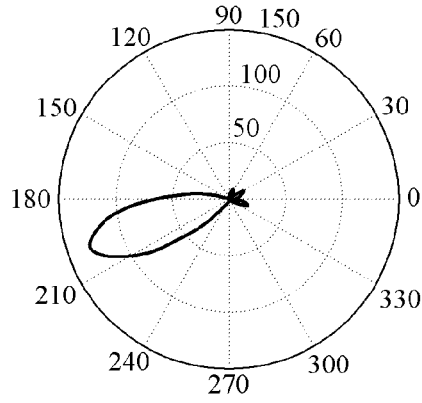
Figure 11F:
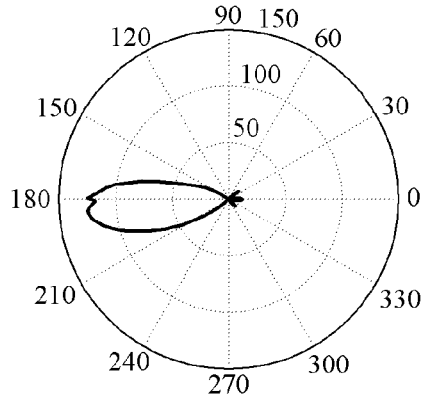

FIG. 11A illustrates an estimation result of an AoA at a location DAQ1, FIG. 11B illustrates an estimation result of an AoA at a location DAQ7, and FIG. 11C illustrates an estimation result of an AoA at a location DAQ13. Also, FIG. 11D illustrates an estimation result of an AoA at a location DAQ19, FIG. 11E illustrates an estimation result of an AoA at a location DAQ25, and FIG. 11F illustrates an estimation result of an AoA at a location DAQ39.

Referring to FIG. 10B, the AoA may change similar to locations.

It may be found from FIGS. 9A through 11F that a considerable amount of information about a wireless channel is included in sensor information of a terminal. By utilizing the sensor information to perform beamforming, it is possible to provide a hedge against problems of the related art, for example, a link setup delay time, a change in a communication link due to a movement of a terminal and a blocking phenomenon.

Figure 12:
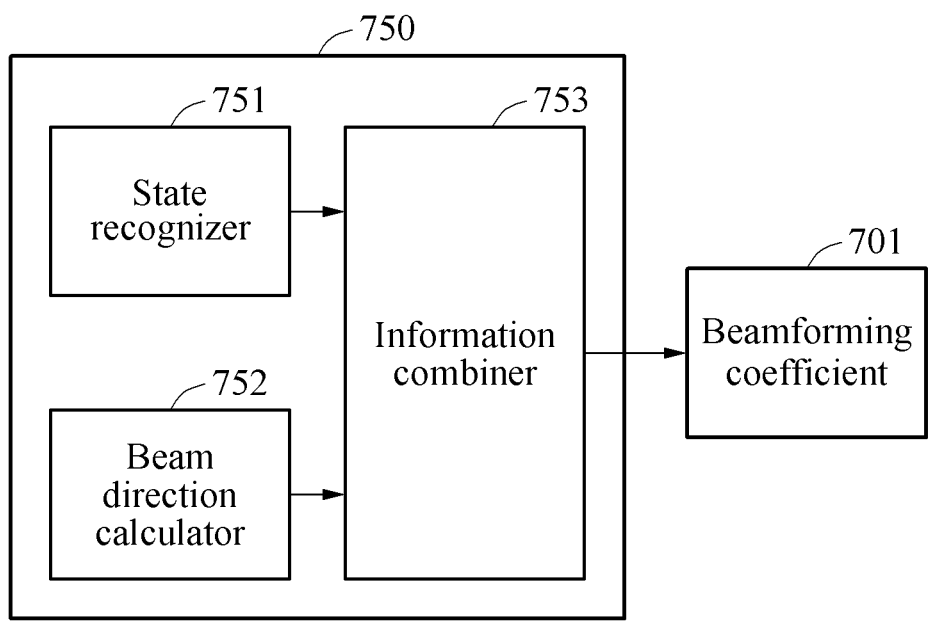
FIG. 12 is a block diagram illustrating a method of determining a beamforming coefficient in a determiner of a terminal according to an example embodiment.

FIG. 12 is a block diagram illustrating a method of determining a beamforming coefficient in a determiner of a terminal according to an example embodiment.

The determiner 750 of FIG. 7 may include a state recognizer 751, a beam direction calculator 752 and an information combiner 753.

The state recognizer 751 may acquire information about a movement state and an environment of the terminal 700 in addition to a channel parameter of a wireless channel from a sensor of the terminal 700. The beam direction calculator 752 may calculate a beam direction based on sensor information.

The information combiner 753 may combine the calculated beam direction with the channel parameter and the information about the movement state and the environment, and may determine the final beamforming coefficient 701.

Figure 13A:
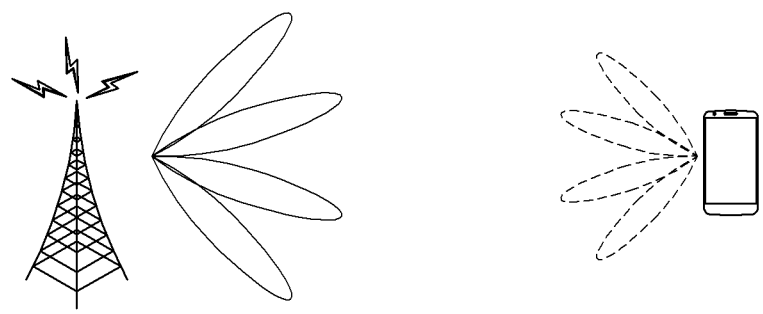
FIGS. 13A and 13B are diagrams illustrating examples of beamforming according to an example embodiment.
Figure 13B:
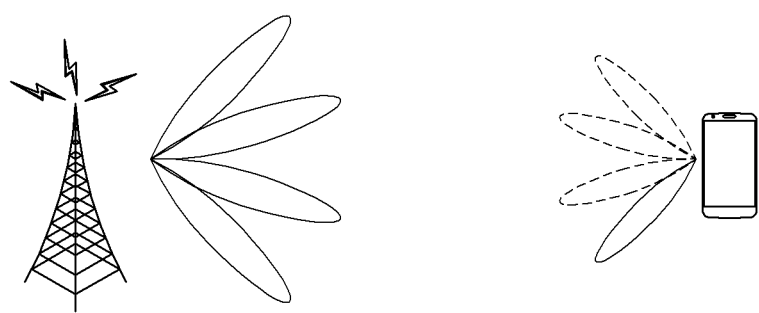

FIGS. 13A and 13B are diagrams illustrating examples of beamforming according to an example embodiment.

As shown in FIG. 13A, beamforming may be performed in a direction acquired based on a final beamforming coefficient. A beamforming direction may be maintained when a movement state and a communication environment of a terminal do not change.

When the movement state or the communication environment changes during beamforming, the terminal may change the direction and perform beamforming as shown in FIG. 13B, instead of searching for a new beam again and performing beamforming.

For example, a direction to which the direction is changed may be determined based on channel parameters and sensor information collected by a sensor of a terminal.

Figure 14:
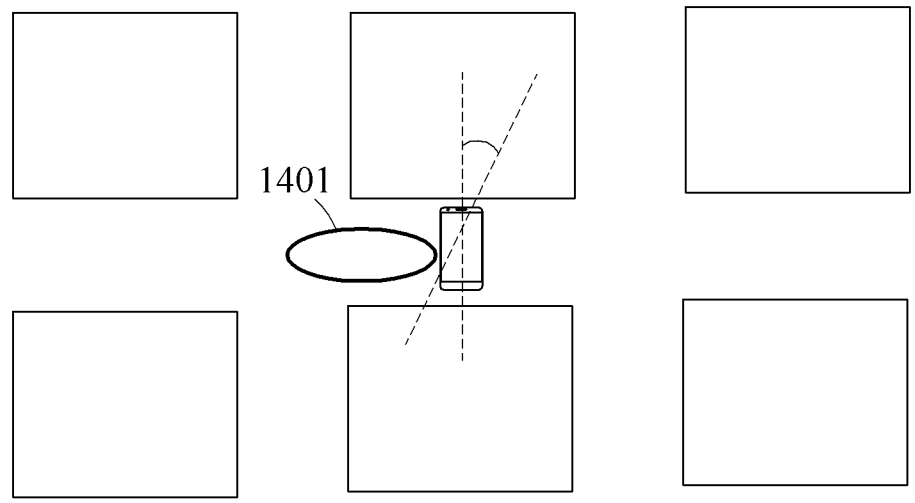
FIG. 14 is a diagram illustrating an example of beamforming using a sensor of a terminal according to an example embodiment.

FIG. 14 is a diagram illustrating an example of beamforming using a sensor of a terminal according to an example embodiment.

FIG. 14 illustrates an example of determining a beamforming coefficient by recognizing a surrounding environment using the sensor of the terminal.

In the example of FIG. 14, when the terminal is located on a road (for example, a street canyon) between obstacles (for example, buildings), radio waves may reach a transmitter and a receiver by reflection and refraction along the road. Accordingly, a beamforming direction 1401 of the terminal may be determined along a side of the road as shown in FIG. 14.

Figure 15:
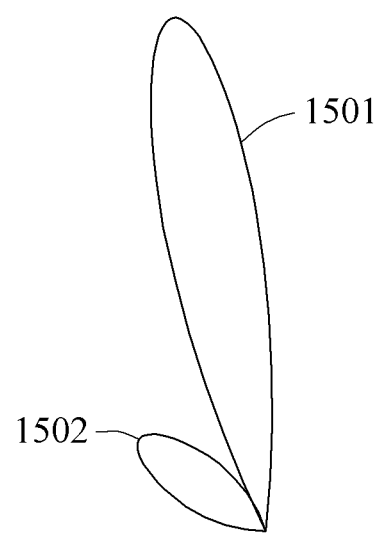
FIG. 15 is a diagram illustrating an example of determining a main beam and an auxiliary beam according to an example embodiment.
Figure 16:
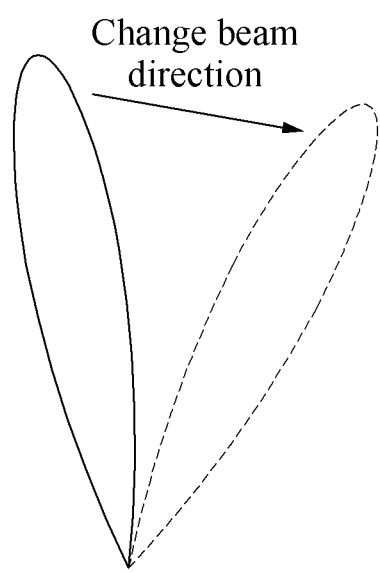
FIG. 16 is a diagram illustrating an example of changing a beam direction according to an example embodiment.

FIGS. 15 and 16 illustrate examples of determining a final beamforming coefficient according to an example embodiment.

FIG. 15 is a diagram illustrating an example of determining a main beam and an auxiliary beam according to an example embodiment.

In FIG. 15, a signal level of a communication feedback channel may be used to determine a final beamforming coefficient.

A main beam 1501 may be formed in a beam direction calculated based on information acquired from the signal level. Also, an auxiliary beam 1502 may be formed in a direction acquired from a sensor of a terminal. Thus, a direction of beamforming may be determined.

FIG. 16 is a diagram illustrating an example of changing a beam direction according to an example embodiment.

In FIG. 16, sensor information of a terminal may be used to determine a final beamforming coefficient.

FIG. 16 illustrates a change between beam directions acquired from a signal level and the sensor information of the terminal. For example, when the signal level decreases due to blocking, a beam direction acquired based on the signal level may be immediately changed to a beam direction acquired based on the sensor information, to prevent a communication link in the terminal from being disconnected.

According to example embodiments, to perform beamforming, information sensed by various sensors of a terminal (for example, a motion sensor, an acceleration sensor, a compass or a GPS) may be utilized.

Also, according to the example embodiments, it is possible to reduce a period of time to search for a beam during a setup of a communication link and to maintain a connection to the communication link regardless of a sudden state change of a terminal, for example, a blocking phenomenon.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The above-described example embodiments may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A beamforming method of a terminal, the beamforming method comprising:
    acquiring a beamforming signal;
    calculating a beamforming coefficient to correspond to locations of a transmitter and a receiver, based on the beamforming signal;
    acquiring sensor information of the terminal;
    estimating a channel parameter based on the sensor information; and
    determining a final beamforming coefficient based on the beamforming coefficient and the channel parameter,
    wherein the determining of the final beamforming coefficient comprises determining the final beamforming coefficient so that a main beam is formed in a first direction determined by the beamforming coefficient and that an auxiliary beam is formed in a second direction determined by the channel parameter.

2. The beamforming method of claim 1, wherein the acquiring of the beamforming signal comprises acquiring the beamforming signal using one of a feedback channel and an observed signal level.

3. The beamforming method of claim 1, wherein the acquiring of the sensor information comprises acquiring the sensor information from at least one sensor among a motion sensor, an acceleration sensor, a compass and a global positioning system (GPS).

4. The beamforming method of claim 1, wherein the estimating of the channel parameter comprises estimating a wireless channel environment of the terminal and a variable of a physical channel of the terminal.

5. The beamforming method of claim 4, wherein the estimating of the wireless channel environment and the variable of the physical channel of the terminal comprises estimating at least one of information about a movement, a location and an orientation of the terminal based on the sensor information.

6. The beamforming method of claim 1, wherein the determining of the final beamforming coefficient comprises:
    acquiring a movement state of the terminal and a wireless channel environment of the terminal based on the channel parameter; and
    determining the final beamforming coefficient by synthetically using the beamforming coefficient, the wireless channel environment and the movement state.

7. The beamforming method of claim 1, further comprising:
    performing beamforming based on the final beamforming coefficient.

8. A non-transitory computer-readable storage medium storing a program for causing a processor to perform the method of claim 1.

9. A beamforming method of a terminal, the beamforming method comprising:
    acquiring a beamforming signal;
    calculating a beamforming coefficient to correspond to locations of a transmitter and a receiver, based on the beamforming signal;
    acquiring sensor information of the terminal;
    estimating a channel parameter based on the sensor information; and
    determining a final beamforming coefficient based on the beamforming coefficient and the channel parameter,
    wherein the determining of the final beamforming coefficient comprises:
    determining the final beamforming coefficient so that a beam is formed in a first direction determined by the beamforming coefficient;
    sensing a change in a signal level during a communication based on the final beamforming coefficient; and
    updating the final beamforming coefficient to immediately change the first direction to a second direction determined by the channel parameter.

10. A non-transitory computer-readable storage medium storing a program for causing a processor to perform the method of claim 9.

11. A terminal comprising:
a signal acquirer configured to acquire a beamforming signal;
a calculator configured to calculate a beamforming coefficient to correspond to locations of a transmitter and a receiver;
a sensor information acquirer configured to acquire sensor information of the terminal;
an estimator configured to estimate a channel parameter based on the sensor information; and
a determiner configured to determine a final beamforming coefficient based on the beamforming coefficient and the channel parameter,
wherein the determiner is further configured to determine the final beamforming coefficient so that a main beam is formed in a first direction determined by the beamforming coefficient and that an auxiliary beam is formed in a second direction determined by the channel parameter.

12. The terminal of claim 11, wherein the estimator is further configured to estimate at least one of information about a movement, a location and an orientation of the terminal based on a wireless channel environment of the terminal and a variable of a physical channel of the terminal.

13. The terminal of claim 11, wherein the determiner is further configured to acquire a movement state of the terminal and a wireless channel environment of the terminal based on the channel parameter and to determine the final beamforming coefficient by synthetically using the beamforming coefficient, the wireless channel environment and the movement state.

14. The terminal of claim 11, wherein the determiner is further configured to perform beamforming based on the final beamforming coefficient.

15. A terminal comprising:
a signal acquirer configured to acquire a beamforming signal;
a calculator configured to calculate a beamforming coefficient to correspond to locations of a transmitter and a receiver;
a sensor information acquirer configured to acquire sensor information of the terminal;
an estimator configured to estimate a channel parameter based on the sensor information; and
a determiner configured to determine a final beamforming coefficient based on the beamforming coefficient and the channel parameter,
wherein the determiner is further configured to:
determine the final beamforming coefficient so that a beam is formed in a first direction determined by the beamforming coefficient; and
update the final beamforming coefficient to immediately change the first direction to a second direction determined by the channel parameter when a change in a signal level is sensed during, a communication based on the final beamforming coefficient.

\* \* \* \* \*